July 23, 1963 F. P. SHANNON 3,098,312
MINNOW HOLDER
Filed April 3, 1961
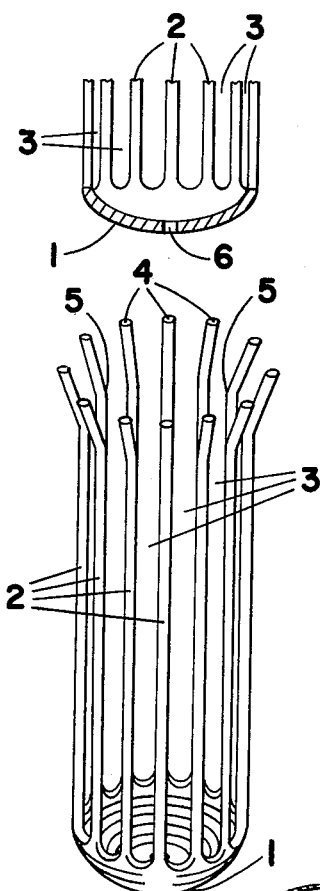
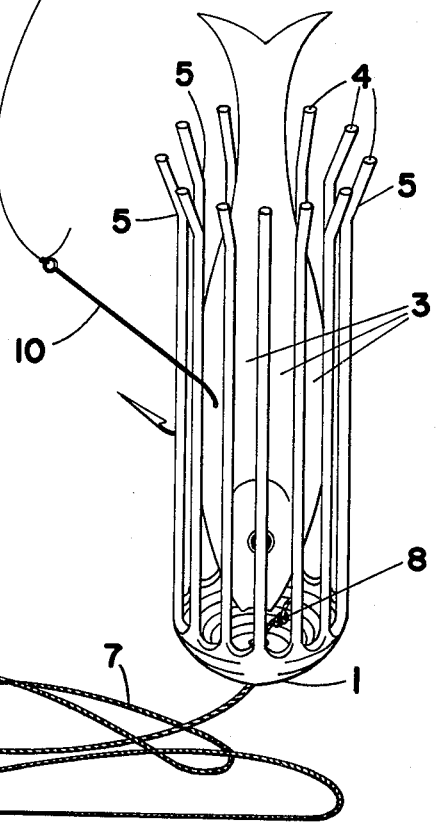
INVENTOR.
FRANK P. SHANNON
BY

United States Patent Office 3,098,312
Patented July 23, 1963

3,098,312
MINNOW HOLDER
Frank P. Shannon, 124 11th St., Silvis, Ill.
Filed Apr. 3, 1961, Ser. No. 100,047
1 Claim. (Cl. 43—4)

This invention relates generally to fishing and is more particularly concerned with bait handling means and the like.

The object and general nature of this invention is the provision of new and improved means for holding a minnow while placing it on a hook for use as a live bait. More specifically, it is a feature of this invention to provide a minnow holder that comprises a container having a bottom and sides formed as open-ended slots, the holder being generally oval in section so as to snugly receive and hold a minnow, and the slots permitting a hook to be passed therethrough to impale the minnow on the hook, after which the latter with the minnow thereon may be readily withdrawn from the holder.

A further feature of this invention is the provision of a minnow holder, useful for holding a minnow when baiting the hook with the minnow, that comprises a generally cylindrical member having a bottom or base and sides formed as spaced apart generally parallel bars or posts fixed at one end to the base and unconnected at their other ends.

These and other objects and advantages of this invention will be apparent to those skilled in the art after a consideration of the following description of the preferred embodiment, taken in conjunction with the accompanying drawings, in which:

FIG. 1 is a perspective view of my device with a minnow disposed therein and with a hook passed through the body of the minnow.

FIG. 2 is a perspective view of the minnow holder of my invention, showing the parallel posts or rods forming the sides of the holder.

FIG. 3 is a fragmentary sectional view showing the closed bottom with the cord opening therein.

Referring first to FIG. 1, the minnow holder of this invention comprises a base or bottom 1 having a plurality of posts or rods 2 joined at their lower ends to the base or bottom 1 and extend upwardly therefrom in generally parallel relation with spaces 3 therebetween. The outer ends 4 of the rods or posts are flared outwardly, as at 5. The base or bottom is preferably oval in plan.

The device just described forms a generally cylindrical container having a solid bottom and rod-like sides having open ended slots extending substantially the full length of the container.

The device of my invention is used as follows:

A minnow is picked up from the minnow pail and dropped head first into the minnow holder. The latter is dimensioned to receive the minnow fairly snugly so that no matter how he squirms and wriggles he cannot escape from the minnow holder so long as it is held upright. If desired, the holder may be made in several sizes. Also, the rods or posts are spaced close enough together so that there is no chance of the minnow escaping through the spaces.

Thus confined by the base 1 and rods or posts 2, the minnow is easily impaled on a fish hook by passing the hook into one of the spaces 3, forcing the point of the hook through some portion of the body of the minnow and out through the generally opposite space 3, after which the hook and minnow thereon may be withdrawn from the minnow holder, the hook passing out through the open ends of the slots or spaces 3. The flared portions 5 facilitate movement of the minnow into the holder, and after the minnow is in the holder it is thereafter not necessary to touch or handle the minnow. Thus, baiting a hook with a live minnow or the like is much easier when using the device of this invention as compared with trying to hold a slippery squirming minnow in one hand while trying to use the other hand to force the point of the hook through the body of the minnow.

If desired, the bottom 1 may have a central opening 6 (FIG. 2) to receive a cord 7 or the like. The cord has a knot 8 in the end larger than the opening 6 to maintain the cord connected with the holder. The other end of the cord may be tied to the minnow bucket whereby the holder of my invention is instantly available for use whenever it is desired to bait the hook, which is shown at 10.

The number and position of the rods or posts 3 may vary, as desired, according to the size of the minnow to be used, the essential being that there shall be enough rods or posts to prevent the escape of the minnow.

While I have shown and described above the preferred structure in which the principles of this invention have been incorporated, it is to be understood that my invention is not to be limited to the specific structure shown and described above, but that, in fact, widely different means may be employed in the practice of the broader aspects of my invention.

What I claim, therefore, and desire to secure by Letters Patent is:

A minnow holder comprising an elongated member of generally cylindroidal configuration and having one end in the form of a base generally oval in section from the generally peripheral portions of which extend a plurality of peripherally spaced rod-like parts generally in parallelism and extending in an axial direction and defining a minnow-receiving area of substantially constant cross-section, the outer ends of said parts being unconnected with one another, forming thereby hook-receiving spaces between said parts and an open end for said holder dimensioned to accommodate the insertion of a minnow into said holder, there being flared out portions on the ends of said rod-like parts and the number of said parts being at least greater than four so that the circumferential spacing between said parts is sufficiently small that a minnow, inserted down through said open end into the space within said plurality of rod-like parts, will be loosely held in place therein, said spacing being sufficient to accommodate the insertion of a fish hook into the body of the minnow inserted wholly or partially into said holder, the unconnected end portions of said rod-like parts providing for the passage of the hook, with minnow attached thereto, outwardly past the ends of said parts with the minnow impaled thereon.

References Cited in the file of this patent

UNITED STATES PATENTS

| | | |
|---|---|---|
| 491,558 | Hill | Feb. 14, 1893 |
| 886,352 | Cunnington | May 5, 1908 |
| 930,576 | Tubbs | Aug. 10, 1909 |
| 2,551,486 | Burden | May 1, 1951 |
| 2,982,045 | Highzand | May 2, 1961 |

FOREIGN PATENTS

| | | |
|---|---|---|
| 21,000 | Great Britain | 1899 |